United States Patent
Guillory et al.

[15] 3,636,348
[45] Jan. 18, 1972

[54] METHOD OF TESTING POLYMER STABILIZERS

[72] Inventors: Jack P. Guillory; Charles F. Cook, both of Bartlesville, Okla.

[73] Assignee: Phillips Petroleum Company

[22] Filed: Feb. 5, 1970

[21] Appl. No.: 8,980

[52] U.S. Cl. ..................................250/52, 73/150, 250/42, 250/51
[51] Int. Cl. ....................................G01n 21/00, G01n 23/00
[58] Field of Search.................73/150, 432 SD; 250/42, 51, 250/52

[56] References Cited

UNITED STATES PATENTS 3,224,266  12/1965  Klippert...................................73/150

Primary Examiner—William F. Lindquist
Attorney—Young and Quigg

[57] ABSTRACT

A method for isolating the ultraviolet-screening effects of a stabilizer in a stabilized polymer for testing other effects of said stabilizer on the polymer.

6 Claims, 2 Drawing Figures

INVENTORS
J. P. GUILLORY
C. F. COOK
BY Young & Quigg
ATTORNEYS

METHOD OF TESTING POLYMER STABILIZERS

This invention relates to a method for testing polymer stabilizers. In another aspect, this invention relates to a method for isolating ultraviolet-screening effects of a stabilizer in a stabilized polymer film.

Polymers generally have stabilizers associated therein to promote photostability. These stabilizers are of different effectiveness and sometimes produce other different effects on the polymer. Heretofore, it has been most time consuming to determine stabilizer effects on polymers and with the heretofore methods the operator has been unable to separate what different effects the stabilizers have on a stabilized polymer film.

It is therefore an object of this invention to provide a method for testing polymer stabilizers. Another object is to provide a method for isolating ultraviolet-screening effects of a stabilizer in a stabilized polymer film. Yet another object is to provide a method whereby the properties of one solvent can be compared to the properties of other solvents on a common-type stabilized polymer film. Other aspects, objects, and advantages of the present invention will become apparent from the study of the disclosure, the appended claims, and the drawings.

The drawings are diagrammatic views of the apparatus used in this invention to prepare polymer films for testing.

Figure 1:
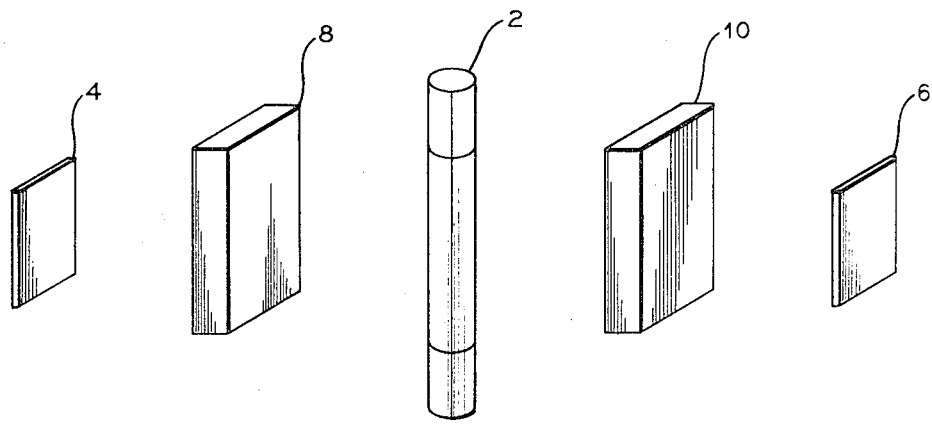
FIG. 1 is a view of apparatus testing one polymer stabilizer.

Referring to FIG. 1, a light source 2 is provided adjacent first and second polymer films 4, 6. Each film 4, 6 is separated and screened from the light source by intervening first and second filter cells 8, 10. In an example arrangement, the first film 4 is a stabilized film, the first filter cell 8 contains a spectograde solvent which transmits light of wavelengths greater than about 3,000 A., the light source 2 is a Xenon lamp, the second filter cell 10 contains a solvent comprising a solvent of the first filter cell and the stabilizer to be tested, and a second film 6 is a polymer film having no stabilizer contained therein.

For simplicity, the stabilizer referred to herein is any light-screening stabilizer utilized with polymers to protect said polymer against ultraviolet degradation and the solvent is any spectograde solvent that transmits light of wavelengths greater than 3,000 A. Examples of this type solvent are: methanol, ethanol, hexane, cyclohexane, and tetrahydrofuran. Although any solvent of the above-described type can be used with this invention, it is preferred that methanol or ethanol be utilized to provide a system whose solvent is easily obtainable since said solvent and stabilizer solution must be regularly changed. It is recommended that the filter solution be replaced about every 50 hours of use to prevent photodecomposition of the filter solution from causing changes in their ultraviolet absorption properties.

The light source 2 used with this invention should be medium or high pressure mercury arc lamps or a Xenon lamp. These light sources produce large quantities of light having a wavelength in the range of 3,000 to 4,000 A. If other types of light sources are utilized or solvents are utilized which absorb a measurable quantity of light of the 3,000–4,000-A. wavelength, then the films are improperly exposed relative to sunlight conditions and subsequent testing results are inaccurate.

Figure 2:
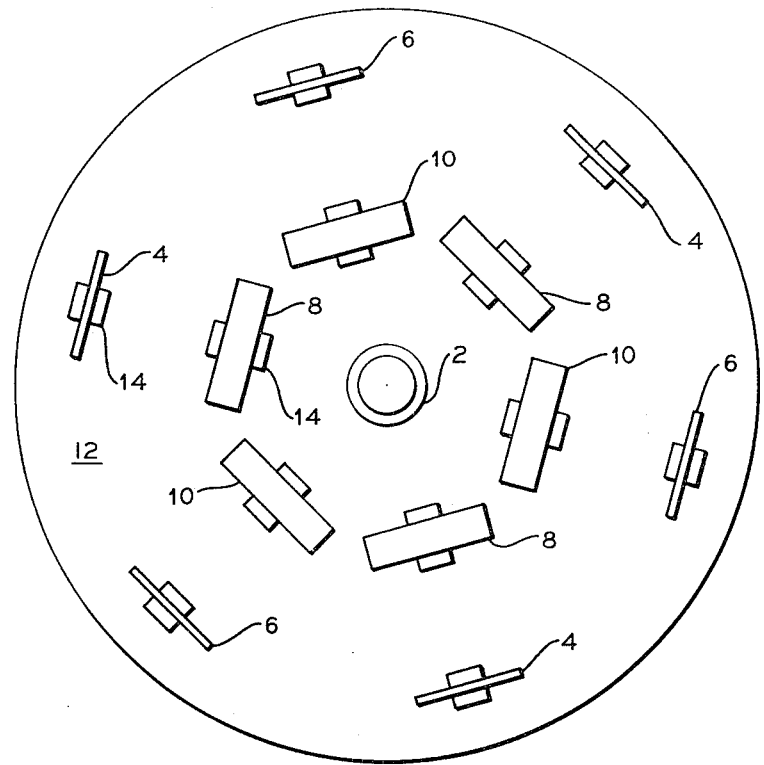
FIG. 2 is an apparatus for testing a plurality of polymer stabilizers.

Referring to FIG. 2, a light source 2 is provided at a central location such as, for example, the center of a base 12. A plurality of polymer samples 4 and 6, are positioned around the light 2 and separated from said light 2 by a plurality of intervening associated filter cells 8, 10. Each cell 8 or 10 is associated with its respective polymer 4 or 6 and has dimensions larger than the associated sample 4 or 6. Holding means 14 are positioned for maintaining the light source 2, polymer samples 4, 6 and filter cells 8, 10 at their relative positions. These holding means are releasable for periodically removing the sample and rotating said sample 180°.

In the operation of the process of this invention, two films are formed from a desirable preselected polymer. The term "films" is used herein for convenience and shall mean any polymer article regardless of the dimensions. A first film 4 is formed of a mixture of the polymer and the stabilizer to be tested. The second film 6 is formed of the polymer of the first film but does not contain the stabilizer. Each polymer film is formed under substantially identical conditions of temperature and pressure and are of substantially identical dimensions relative one to the other. The fraction of light absorbed by the polymer portion and the fraction of light absorbed by the stabilizer portion of the stabilized polymer film are determined by an ultraviolet spectrometer. A solvent is used in the first filter cell 8. A solution comprising the stabilizer of the first film and the solvent is used in the second filter cell 10. The stabilizer in the solution of the second filter cell 10 has a concentration sufficient to pass an amount of light such that the polymer portion absorbs the same amount of light as the polymer portion in the stabilized film. Light having a wavelength in the range of 3,000 to 4,000 A. is passed from the light source, through the first and second filter cells 8, 10 and onto the first and second polymer films 4, 6.

By the arrangement of light passing through only solvent and onto a stabilized polymer film 4, the effects of the stabilizer on filter degeneration of the polymer can be observed and measured. By providing the passage of the same wavelength of light for the same duration through a stabilizer solution 10 that screens out the same amount of light as is screened from the polymer portion by the stabilizer of the stabilized first film 4, and striking an unstabilized polymer film 6 with that portion of light, it then becomes possible to observe the effects of ultraviolet absorption on the polymer. A comparison of subsequent tests made on the first film relative to the second film thereby provides an operator a means for determining effects of a stabilizer on a polymer other than those effects caused by light screening alone. In the method of this invention, the light-screening properties of the stabilizer have been utilized to protect the second film 6 without subjecting said film to other effects said solvent might have when incorporated with the polymer. Subsequent tests such as, for example, 180° flex-bend test, relative carbonyl content by infrared analysis, molecular weight test, etc., can be made on the films to determine if the stabilizer being tested imparts beneficial or detrimental effects to the polymer. Without isolating the ultraviolet screening effects of the stabilizer, the other effects such as excited-state quenching, for example, could not be quantitatively or qualitatively measured.

It should also be understood that this invention can be utilized with a plurality of different stabilizers, stabilizer solutions of different concentrations, and substantially identical polymer film pairs each adjacent a common light source. These plurality of thin film pairs are each light treated for a substantially equal period of time. By so providing and exposing different film pairs it is possible by this invention to test the films and evaluate the effects of one stabilizer relative to another.

The following example 180° flex-bend tests were run on polypropylene film pairs I, II, and III, testing commercial stabilizers A, B and C. The results of these tests were as follows:

| Film Pair | Stabilized with Stabilizer | Failure (Hours of Radiation) |
|---|---|---|
| I | A—Yes | 1,230 |
|  | A'—No | 450 |
| II | B—Yes | 1,100 |
|  | B'—No | 225 |
| III | C—Yes | 800 |
|  | C'—No | 770 |

All polymers of all film pairs were polypropylene film compressed to 20,000 pounds at 190° C. for 2 minutes. Film A contains 0.25 php of stabilizer and films B and C contained 0.1 php of stabilizer. Stabilizers A and B were the same stabilizer in different proportions. The filter cells were glass filter vessels filled with solvent or solutions of stabilizer and solvent. The light source was a 450-watt high-pressure mercury lamp. The film pairs II and III were rotated 180° every 50 hours during exposure to the light. The temperature of the reactor was maintained at 30°–35° C., each sample polymer film was flexed about 180° by bringing opposed ends of the film together periodically generally every 20 hours plus 1–4 hours. Upon failure of each sample the amount of time that sample had been exposed to the light source was noted as the failure time. By comparing the failure times of each polymer film of each pair, it can be seen that some of the stabilizers, when incorporated in the polymer, perform functions other than light screening. If the stabilizer performed no other function than light screening, then the polymer film, A, B or C, of each pair would fail at the same time as its associated unstabilized film A', B' or C'.

A study of the tests shows that the stabilizer A and B has other beneficial effects on a polypropylene film. Stabilizer C shows that light-screening properties were imparted to the polymer but the stabilizer C did not perform other functions when incorporated with the polymer.

Other modifications and alterations of this invention will be apparent to those skilled in the art from the foregoing discussion, example, and accompanying drawing, and it should be understood that this invention is not to be unduly limited thereto.

What is claimed is:

1. A method for isolating the ultraviolet-screening effects of a stabilizer in a stabilized polymer film comprising:

passing light from a light source through a solvent to strike a stabilized polymer film while passing light from the light source through a solution of the solvent and a stabilizer to strike an unstabilized polymer film, said stabilized and unstabilized polymer films being of the same polymers, formed under substantially identical conditions, and having substantially identical dimensions such that the difference between said films resides substantially in the presence of said stabilizer, and said solvent and solution being of dimensions along the pathway of light passing therethrough such that said solvent and said solvent of the solution pass substantially equal amounts of light therethrough, and said stabilizer of said solution being of a concentration sufficient for passing light to the unstabilized polymer film in an amount sufficient for the absorption of substantially equal amounts of light by the unstabilized polymer film and the stabilized polymer film; thereby isolating the ultraviolet-screening effects of the stabilizer.

2. A method, as set forth in claim 1, wherein the light absorbed by each portion of the stabilized film is determined by an ultraviolet spectrometer.

3. A method, as set forth in claim 1, wherein the solvent is a spectrograde solvent which transmits light having wavelengths greater than about 3,000 A. and the light source passes light having wavelengths in the range of 3,000 to 4,000 A.

4. A method, as set forth in claim 1, wherein the solvent is methanol.

5. A method, as set forth in claim 1, wherein the solvent is ethanol.

6. A method, as set forth in claim 1, wherein each polymer film is periodically rotated 180°.

* * * * *